No. 889,735. PATENTED JUNE 2, 1908.
W. M. UNDERHILL.
STALL FOR ANIMALS.
APPLICATION FILED APR. 16, 1907.
2 SHEETS—SHEET 2.

WITNESSES
INVENTOR
William M. Underhill
BY
ATTORNEYS

UNITED STATES PATENT OFFICE.

WILLIAM MOTT UNDERHILL, OF OCONTO, WISCONSIN.

STALL FOR ANIMALS.

No. 889,735.　　　　Specification of Letters Patent.　　　Patented June 2, 1908.

Application filed April 16, 1907. Serial No. 368,501.

*To all whom it may concern:*

Be it known that I, WILLIAM MOTT UNDERHILL, a citizen of the United States, and a resident of Oconto, in the county of Oconto and State of Wisconsin, have invented new and useful Improvements in Stalls for Animals, of which the following is a full, clear, and exact description.

This invention is an improvement on the patented devices of my invention, comprising patents numbered 595,504, dated December 14, 1897 and 777,051, dated December 6, 1904.

This improvement particularly relates to cow stalls that may be arranged plurally in sequence or singly, as may be desired.

The purposes of the present invention are to render the cow stall more convenient, afford better control of the animal while stalled, furnish more simple and effective means for receiving and holding liquid or solid excrement voided by an animal while confined in the stall, and furthermore facilitate the transfer of all such voidings into a gutter or like receptacle at the rear edge of the stall, whether the animal is standing or lying down, whereby the floor of the stall is kept clean and soiling of the hide of the animal is prevented.

The invention consists of novel details of construction and combinations of parts, as is hereinafter described and defined in the appended claims.

Reference is to be had to the accompanying drawings forming a part of this specification in which similar characters of reference indicate corresponding parts in all the views.

Figure 1:
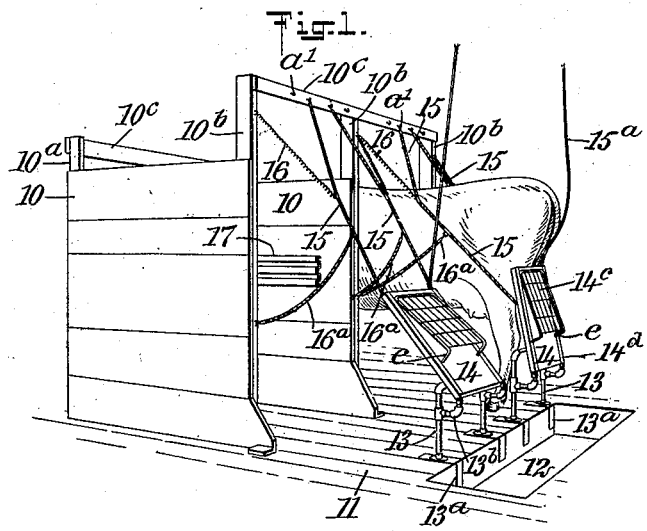
Figure 2:
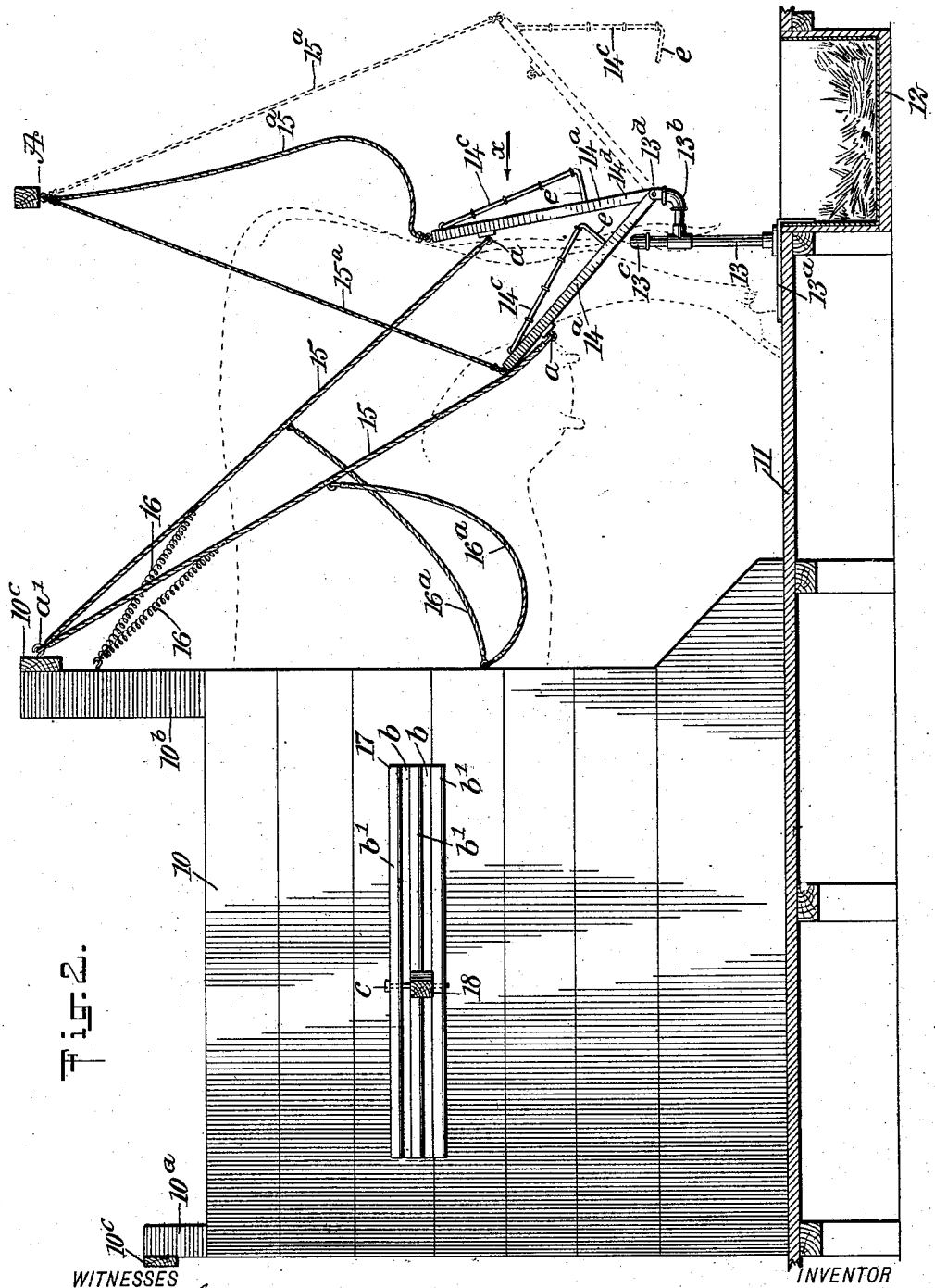

Figure 1 is a perspective view, showing two cow stalls arranged in series laterally, and the approved apparatus for control of an animal in either stall and located at the rear of each stall, a gutter for receiving and holding excrement also being shown at the rear of the apparatus. Fig. 2 is a partly sectional side view of a cow stall and of the improvements in position for service, the device for control of the animal appearing in duplicate, one of said devices being represented in full lines and dotted lines engaging the animal represented in broken lines, and also removed rearwardly therefrom to permit an exit of the animal from the stall. Fig. 3 is an enlarged rear elevation of a chute board of novel construction, a tail guard mounted upon the chute board, and of a supporting frame for said parts, seen in direction of arrow $x$ in Fig. 2. Fig. 4 is an enlarged rear elevation of a chute board in part, and projections thereon for ready engagement therewith of flexible connections, not shown in said view. Fig. 5 is a partly sectional fragmentary view, showing a portion of a side wall for a stall, an end portion of a breast-bar, and means for supporting the breast-bar at different heights on the said side wall, and Fig. 6 is a view similar to Fig. 5, but showing modified means for supporting and securing the end of the breast-bar at a proper height in a horizontal plane.

The side walls 10 of the stalls shown in Figs. 1 and 2 are held erect in parallel planes and suitably spaced apart by front stanchions $10^a$, rear stanchions $10^b$ and two top cross bars $10^c$, which are at their ends respectively secured upon the upper ends of said stanchions, the latter, of course, being affixed upon the side walls of the stalls as usual.

A preferably plank floor 11 is placed at the bottom edges of the side walls of the stall or stalls, and has such length as will permit its rear end to project a suitable distance rearward of the stall side walls 10, and said floor may be given a slight inclination from front to rear.

At a suitable point rearward of the side walls 10, a gutter 12 is formed transversely of the floor 11, having its forward top edge flush with the rear transverse edge of said floor, as is clearly shown in Figs. 1 and 2, which adapts the gutter to receive liquid and solid excrement voided by an animal occupying the stall, this deposition of the excrement being facilitated and positively insured by the employment of other details hereinafter described.

Transversely upon the floor 11, at or near the front transverse edge of the gutter 12, a preferably metal supporting frame is mounted and secured, this frame consisting of a pair of posts 13, preferably erected on angle bracket plates $13^a$ that are secured on the floor and also on the forward wall of the gutter, as shown in Figs. 1, 2 and 3.

The posts 13 are of equal height and preferably are formed of tubing, each post having a similar short arm $13^b$ extended therefrom rearwardly at an equal distance above the floor 11. The upper ends of the posts 13 are connected together by a cross bar or rail $13^c$, which may also be of tubing and when firmly joined to the posts by its ends, completes a frame having a substantially inverted U-shape, the top member of which is supported above the floor and parallel therewith, this construction for one of said frames being shown in Fig. 3 in which the cross bar appears in dotted lines.

A supporting frame, such as described, is placed directly behind a respective stall, but may have less width than the stall, so that an animal occupying the latter, if at an equal distance from each side wall thereof, will be directly in front of and close to said frame, as will be hereinafter more fully explained.

Upon each of the short arms $13^b$, an upward hinge leaf is formed, the uses of which will presently appear.

A chute board 14 of novel construction is a detail of the improvement as herein shown, and comprises a flat board or plate of metal having rectangular form, each side edge thereof being reinforced by a strip or bar $14^a$ secured thereon, said side bars having legs $14^d$ of equal length projected below the lower transverse edge of the chute board or plate.

Upon the front side of the chute board 14, a transverse cleat or batten strip $14^b$ is affixed, and upon said cleat a series of spaced hooks $a$ are secured, these projections affording means for connecting the ends of flexible connections 15 therewith, the hooks being shown in Fig. 4.

The lower ends of the arms $14^d$ are respectively pivoted upon the sides of the hinge leaves that project from the short arms $13^b$, thus providing hinge joints $13^d$ between said parts, whereby the chute board 14 is supported to receive rocking adjustment so as to incline it forward or rearward, and for control of its adjustment the flexible connections 15 coact therewith.

The flexible connections 15, which may be ropes or chains are preferably of an equal length and extend forwardly and upwardly from the chute board 14, their length being sufficient to permit the upper ends thereof to be detachably connected with a hook $a'$ in the bar $10^c$, above and forward of the chute board, it being understood that a series of these projecting hooks, are secured at suitable intervals throughout the length of said bar. Another flexible connection $15^a$ may be attached by one end to the upper portion of the chute board and thence extended upwardly, having its upper end affixed upon the ceiling of the stall or upon any stable object; for convenience in illustration this end of the flexible connection is shown as attached to an overhead beam A in Fig. 2.

In adjusting the flexible connections 15 for service, their lower ends are connected with the chute board 14 at appropriate points, by their attachment to selected hooks $a$, and thence drawn upward and toward each other over the sides and back of the animal in the stall, thus serving to control the side movements of the cow, it being understood that the upper ends of these flexible connections are secured to the cross bar $10^c$ at the rear of the stall, as appears in Fig. 1, and as before mentioned, the means for attaching the flexible connections upon said cross bar may be hooks, arranged at spaced distances apart.

A contractile spring 16 is secured by one end upon each flexible connection 15, at a point opposite the side of the beast and at their opposite ends are secured upon the stanchions or side walls of the stall.

The relative position of the contractile springs 16 is such, that their pull will draw the flexible connections 15 a proper degree away from the animal at each side and thus avoid annoying her, while at the same time these ropes or chains 15 are in position to check an improper side-wise movement of the cow while standing in the stall.

Coacting with the spring drawn flexible connections 15 are chains $16^a$ that are secured upon the sides of the stall by one end thereof, and thence are extended toward said flexible connections, upon which the remaining ends of the chains are attached, the arrangement of the chains $16^a$ being such that they are well adapted for preventing the cow from turning around.

It will be obvious that when the animal is in position within the stall, previous to the adjustment of the spring-drawn flexible connections 15 and chains $16^a$, the chute board 14 is rocked toward the buttock of the cow and rests thereupon, thus disposing the chute board in proper position for receiving excrement and permitting it to slide down into the gutter 12, which the chute board is close to; and it may here be explained that the particular use of the flexible connections 15 and chains $16^a$ is to control the cow so that she will stand directly in front of the chute board when it is rocked into contact with the cow.

It is essential to provide means for controlling the forward and rearward movement of the cow while standing in the stall; to this end the cross bar $13^c$ of the supporting frame for the chute board 14 is available for preventing an improper rearward movement of the animal, as the cross bar $13^c$ will strike against the shanks of the hind legs of the cow if she attempts to back out of the stall.

To prevent an objectionable forward movement of the animal, a breast bar is employed, the means for supporting said bar so as to receive adjustment consisting of the following details that are preferably employed.

Upon the inner surface of each side wall 10, of a stall having the improvements, a bracket plate 17 is secured horizontally and at a proper distance from the floor of the stall and forward of the cross bar 13ᶜ. The bracket plates 17, which may be of wood or metal, are located oppositely upon the walls of the stall and as represented in Figs. 1, 2, 5 and 6, each consists of an elongated plate having a plurality of spaced ribs $b'$, formed longitudinally thereon, leaving channels $b$ between them and, of course, said channels in the plates are disposed oppositely in pairs, each pair being adapted to receive the end portions of a breast-bar 18 or a similar bar 18ᵃ.

The breast bar consists of an elongated substantial strip of wood or metal, having its ends introduced into a selected pair of the channels $b$, thus disposing the bar transversely in the forward portion of the cow stall.

In Fig. 5, one means for holding each of the ends of the breast bar 18 secured in place is shown, consisting of a keeper bolt $c$, that passes down through alined vertical perforations in the ribs $b'$ and also through a perforation in the breast bar after the latter is in position. There are a suitable number of vertical perforations at intervals of length in the ribs $b'$, which may be utilized for holding the breast bar in different positions as may be desired, and it will be seen that the breast bar may have its ends secured in any pair of channels and at any desired point in the length of the same, by the means hereinbefore described.

In Fig. 6, the means for detachably holding the end portions of the breast bar 18ᵃ secured in two appropriate channels $b$ in oppositely secured bracket plates 17ᵃ, is shown in modified form. In this changed construction of the securing means, a number of spaced perforations are formed laterally in the flat outer portion of each rib $b'$, said perforations being designed for reception of the nose $d'$ on a slide bolt $d$, the latter being secured on the upper surface of an end portion of the breast bar 18ᵃ.

The construction of each bracket plate 17ᵃ of a pair is similar, as are also the details of holding respective end portions of the breast bar 18ᵃ secured in place; and obviously either means shown in Figs. 5 and 6, for holding changeably a breast bar in position on the side walls of a stall may be used as preferred.

It will be seen that the breast bar and the means for adjustably supporting it for contact with the breast of a cow, permits its exact adjustment to suit the length of the animal between its breast and rump, so that the latter will with certainty be positioned close to the chute-board 14 and insure the latter always receiving droppings from the beast, for transfer unto the gutter, as hereinbefore explained. Obviously, the means for exactly adjusting the breast-bar toward and from the chute-board, is essential for the proper operation of the latter, as it affords reliable means for quickly changing the position of the breast-bar, as the length of the animal may require, and thus adapt the stall for occupation by animals of different lengths at different times.

Upon the chute board 14, a tail guard 14ᶜ is mounted, this preferably consisting of a meshed frame formed of wire rod or the like, the size of said frame being nearly equal in area to that of the upper portion of the chute board. The tail guard 14ᶜ for each chute board employed, is hinged at its upper transverse edge upon the rear side of the chute board, and on the lower ends of the side members of the tail guard short legs $e$ are formed, that in service seat upon the chute board. The provision of the skeleton tail guard is not claimed as broadly new in this improvement, as said tail guard has already been shown in connection with a chute board in my Patent No. 777,051, but it is herein shown as a useful adjunct that effectively co-operates with the improved chute board and novel means for supporting both of said devices.

In the operation of the improved stall, the animal is afforded free access thereinto by rocking the chute board 14 rearwardly, after it has been released from the pair of flexible connections 15, this rocking movement being readily effected by manipulation of the rope 15ᵃ.

The removal of the chute board from over the floor 11, opens a free passage for the beast back of the rear edge of either side wall 10 and into the stall. Upon an entrance of the cow between the side walls 10, assuming that the breast bar is in proper position suitably removed from the chute board 14, it will be seen that the breast bar will have contact with the breast of the animal, when the chute board and its supporting frame are a short distance rearward of the buttock of the animal.

The lower ends of the flexible connections 15 are now attached upon appropriate projections $a$, to effect which the chute board is rocked forwardly so as to bear lightly upon the buttock of the animal, and may have pressure upon the animal's tail, it being understood that the upper ends of said flexible connections 15 have previously been secured upon the cross bar 10ᶜ, at proper points for encompassing the sides and back of the cow with said flexible connections.

It will be seen that the contact of the chute board 14 with the tail of the animal, will hold it depressed and thus prevent a switching action of said tail while the animal is being milked; and it may be here explained that the flexible connections 15 and chains 16ᵃ check any disposition of the animal to crowd laterally and incommode the person doing the milking. Furthermore, said flexible connections and chains also prevent the animal from turning around in the stall or from getting her head under either connection 15 to effect such a turning movement.

By relaxing stress on the chute board, which is effected if the flexible connections 15 are slackened a proper degree, the animal is permitted to withdraw its tail from beneath the chute board and use it freely.

As before stated, from the relative position of the chute board 14 when it is inclined forwardly and in enforced contact with the buttock of the animal, all voidings of the beast will be caught on the chute board and pass from it into the gutter 12, and this will be the case when the beast is standing or lying down. When in a standing position, the tail of the cow will be protected from soiling, by the guard frame 14ᶜ whereon the tail will rest and thus be held away from liquid or solid voidings of the animal.

Slight changes may be made in minor constructive details within the scope of the invention, which mainly consists in the breast bar and its means for adjustable support, the improved chute board, the supporting frame for the chute board, whereon it is rockably mounted, the flexible connections between the chute board and a cross bar on the stall and which are adjustable on said parts, the contractile springs that coact with the flexible connections, the chains which guard against a turning movement of the animal in the stall and a gutter disposed across the stall at the rear edge of its floor.

Having described my invention, I claim as new and desire to secure by Letters Patent:

1. In a cow stall, the combination with a floor for the stall, and a gutter arranged transversely at the rear edge of the floor, of a chute board, and a supporting frame therefor, said frame comprising posts erected on the floor close to the gutter, a transverse spacing bar extended between the upper ends of said posts, and hinge joints between the posts and lower portions of side bars on the chute board.

2. In a cow stall, the combination with a floor for the stall, and a gutter transversely disposed at the rear edge of the floor, of a supporting frame, consisting of two posts erected closely to the forward edge of the gutter, arms on the posts, a transverse spacing bar joining upper ends of said posts, and a chute board, comprising a flat plate, side bars on said plate having legs projected below the chute board, and hinge joints between lower ends of said legs and the outer ends of the arms.

3. In a cow stall, the combination with a stall having a cross bar on upper portions of the sides of said stall, of a rockably supported chute board, flexible connections extended from the chute board to the cross bar and detachably connected therewith, and contractile springs extended from the flexible connections to a suitable portion of the stall, and exerting their tension on said flexible connections.

4. In a cow stall, the combination with a stall having a cross bar on upper portions of side walls thereof, of a rockably supported chute board, flexible connections changeably secured at their ends on the chute board and on the cross bar, springs exerting their contractile force on the flexible connections, and chains extended from said connections to the structure of the stall at points below the springs.

5. The combination with a cow stall having spaced side walls, two upright rear stanchions supporting said side walls, a cross bar on the upper portions of said stanchions, and flexible connections movably secured at their upper ends upon said cross bar at different points thereon, of a chute board supported for rocking adjustment at the rear end of the stall, and means for securing the lower ends of the flexible connection upon the chute board at selected points, whereby said flexible connections are caused to have contact with the sides of an animal occupying the stall.

In testimony whereof I have signed my name to this specificaton in the presence of two subscribing witnesses.

WILLIAM MOTT UNDERHILL.

Witnesses:
   Richard L. Hall
   C. M. Hill.